(12) United States Patent
Ye et al.

(10) Patent No.: US 7,669,124 B2
(45) Date of Patent: Feb. 23, 2010

(54) SYSTEM AND METHOD FOR MANAGING RESOURCE LOADING IN A MULTILINGUAL USER INTERFACE OPERATING SYSTEM

(75) Inventors: Shenghua Ye, Sammamish, WA (US); Wei Wu, Redmond, WA (US); Julie D Bennett, Medina, WA (US); Kenneth C Hsu, Redmond, WA (US); Laura Gonzalez Gomez, Seattle, WA (US); Mohammed El-Gammal, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/112,991

(22) Filed: Apr. 22, 2005

(65) Prior Publication Data

US 2006/0242621 A1    Oct. 26, 2006

(51) Int. Cl.
*G06F 3/00* (2006.01)

(52) U.S. Cl. ...................... 715/703; 715/264

(58) Field of Classification Search .............. 715/536, 715/703, 531, 265, 264; 704/257
See application file for complete search history.

(56) References Cited

U.S. PATENT DOCUMENTS

| 6,466,900 | B1 * | 10/2002 | Lissauer et al. | 704/7 |
| 6,661,466 | B1 * | 12/2003 | Kou | 348/553 |
| 6,667,736 | B1 * | 12/2003 | Bhansali et al. | 345/171 |
| 2003/0005159 | A1 * | 1/2003 | Kumhyr | 709/246 |
| 2003/0115552 | A1 * | 6/2003 | Jahnke et al. | 715/536 |
| 2006/0142997 | A1 * | 6/2006 | Jakobsen et al. | 704/10 |
| 2007/0073530 | A1 * | 3/2007 | Iso-Sipila et al. | 704/3 |

* cited by examiner

*Primary Examiner*—Kieu Vu
*Assistant Examiner*—Omar Abdul-Ali
(74) *Attorney, Agent, or Firm*—Wolf, Greenfield & Sacks, P.C.

(57) ABSTRACT

A system and method is provided to manage different UI language settings in a central place by merging different UI language settings and related dependency data to an integrated UI language preference list. A set of API functions is provided that enables each resource loader to gain consistent UI language support by interacting with the integrated UI language preference list.

20 Claims, 8 Drawing Sheets

SYSTEM AND METHOD FOR MANAGING RESOURCE LOADING IN A MULTILINGUAL USER INTERFACE OPERATING SYSTEM

FIELD OF THE INVENTION

This invention is related to computer software and, more particularly, to managing resource loading in a multilingual user interface operating system.

BACKGROUND OF THE INVENTION

Distributing software in a global marketplace requires a user interface that is accessible to a variety of users. Generally, an interface is the point at which a connection is made between two elements so that they can work with each other or exchange information. For computer software purposes, an interface is typically software that enables a program to work with the user, with another program including an operating system, or with the computer's hardware. An interface that enables a program to work with a user is called a user interface, which can be a command-line interface, a graphical user interface, or a menu-driven interface.

To facilitate the use of a common user interface ("UI") in different countries/regions, the UI should support multiple languages. A software program usually comprises functional code and localizable UI elements or resources. To provide multiple-language UIs for a software program, traditionally, a software provider localizes the entire software program, and then generates binaries (with code and resources) for each of the supported languages. The traditional approach is generally inefficient, however, in that the software provider must maintain separate software code bases for each of the supported languages. Accordingly, the software provider must independently support each separate software code base, such as providing technical support, providing updates, and/or providing patches.

Another approach to expand the languages supported by a UI utilizes a common software code base in conjunction with various language-specific resource libraries. One such system is Microsoft Corporation's multilingual user interface ("MUI"). Generally described, a MUI-based operating system ("MUI system") includes a common code module and a default resource module that serves as a default language for the UI. Additionally, the MUI system maintains a number of alternative language-specific resource modules for displaying some or all the UI objects in an alternative language. Accordingly, if a user or an application specifies one of the alternative languages supported by the MUI system, the MUI system loads the resources from the corresponding alternative language resource module. For example, if a user selects Spanish as a desired UI language, the operating system ("OS") loads the system resources from a Spanish-specific resource module.

Generally described, a UI resource is an item of data, such as a dialog box or a font in a Windows® environment, that can be displayed on a computer screen. Many UI features in a software program can be altered by adding or replacing UI resources without modifying the program's source code. Resource data usually consists of the data structures, templates, definition procedures, management routines, icon maps, and so forth associated with a particular UI resource, such as a menu, window, or dialog box. An OS often maintains a number of UI resource modules, each of which consisting of UI resources that are used by the OS to realize a specific UI feature.

MUI systems may include various resource loaders. A resource loader obtains and loads resources from the desired language-specific resource module. A resource loader selects between loading resources from a default resource module, typically encoded in English, or from a designated language-specific alternate resource module. Typically, if a desired alternate resource module is unavailable, a resource loader selects the default resource module.

In a MUI system, in order to load the right language file from a list of available ones, each resource loader needs to know what to look for based on a set of rules. These rules are called resource probing rules, which regulate the decision-making process for loading a particular resource. The resource probing rules thus dictate what is displayed to a user of an application or OS. Different limitations, such as imposed by the OS, a software application, and/or a user of the OS or the software application, define resource probing rules for a resource loader.

Figure 1:
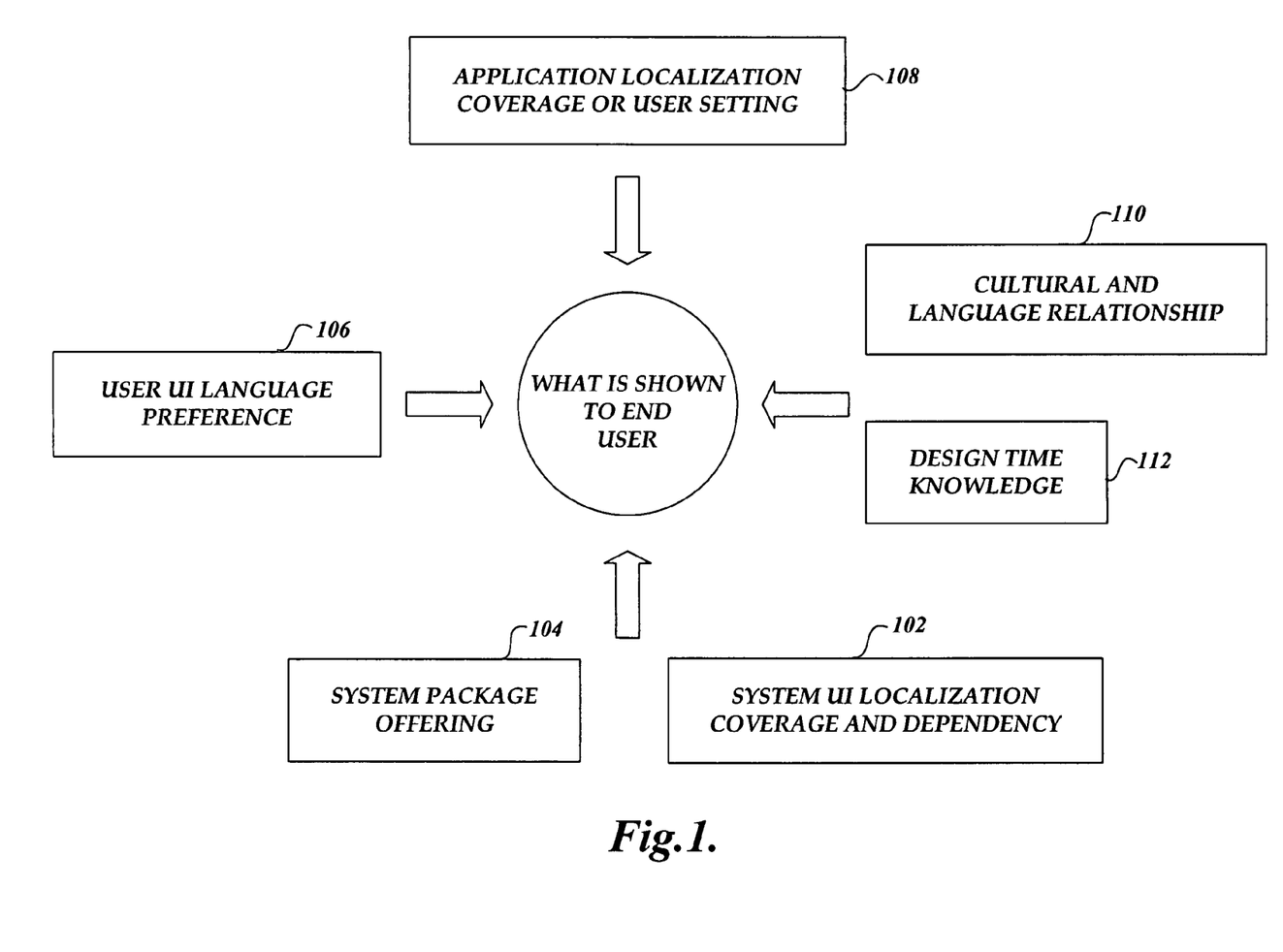
FIG. 1 is a block diagram illustrating exemplary UI language settings that dictate what is shown to an end user.

FIG. 1 illustrates exemplary categories of factors that dictate what system UI is displayed to an end user in a MUI system. The first category is System UI Localization Coverage and Dependency 102. In a MUI system, the OS and/or its components can be partially localized to a particular language and a dependent language is used to substitute the non-localized portion. A resource loader thus needs to know this dependency and tries the dependent language's resources when the resource loader can not locate the resources for the partially localized language.

The second category is System UI Package Offering 104. Depending on what is offered and installed on a particular system, the resource presence for a particular language and for a particular component can be very different. In particular, when a dependent language is used to substitute a partially localized language, the UI languages offered and installed by a system UI package can affect the dependent language available for the partially localized language.

The third category is User UI Language Preference 106. A user of a MUI system can select a particular language as the user's preferred UI language. Often, a user may understand a set of languages instead of just one, and would prefer the system to direct the UI display based on the user's known language list and/or preference. Such a preference may be particularly important to a user if a software program is only partially localized in the user's primary language. For example, a Hong Kong user may prefer to read English instead of simplified Chinese when a software program does not have the user's preferred traditional Chinese UI.

The fourth category is Application Localization Dependency or User Preference 108. Similar to the first category—the System Localization Coverage and Dependency 102, an application's resource coverage can be different among languages. For example, the application can be partially localized in some languages to save localization cost. An application may have different UI language coverage from the system in which the application runs. A user can select to use a particular UI language for the application.

The fifth category of factors that dictate what is displayed to a user is Cultural and Language Relationships 110. A natural relationship usually exists among languages, particularly among languages that share the same root. These languages may be different only in accents or are minor progressive adoptions of the exact same language, i.e., the root language. The root language is sometimes referred to as the neutral language, and the others are referred to as a language specific. For example, English is the neutral, original language, while American English, British English, and Australian English are the exemplary languages specifics for the root language English. From a UI localization perspective, if resources for a particular language specific are not found, a natural substitute will be the corresponding resources of the neutral language, i.e., the root language of the language specific.

The sixth category of factors that dictate what is displayed to a user in a MUI system is Design Time Knowledge 112. When everything fails, a resource loader may load the original UI language that a program designer uses during software creation time. The resource loader trusts that the program designer provides the original UI language accurately. When a resource for a particular language does not exist, for example, either because the resource is not installed or localized to the particular language, the resource loader can always try the original UI language designated by the program designer at the software creation time.

Therefore, each category of factors dictates the use of a specific list of languages. For example, an application's UI language availability and user selection dictates a UI language preference list for the application. A user's UI language preference decides the languages in which a resource loader can select to load the resources in. Thus, any factor in these exemplary categories can affect the availability of a particular resource or the appropriateness of using a particular resource. The variety and complexity of factors thus affect the set of resource probing rules, i.e., the process that a resource loader decides what resources to load. If every single resource loader in a MUI system implements its own resource probing rule, different resource probing rules may be used in a MUI system and cause random and mixed language UI items being displayed to a user.

Therefore, there exists a need to centralize resource probing rules applicable to a MUI system and enable the system, applications in the system, and users of the application and system to communicate with centralized resource probing rules via a standard interface.

SUMMARY OF THE INVENTION

The invention addresses the above-identified need by providing a system and method that merges different UI language settings into an integrated UI language preference list ("the List"). The List captures different UI language settings and dependency data and thus provides a systematic way to manage different UI language settings. The invention further provides a set of API functions that allows resource loaders and applications to query or modify different resource lookup behaviors by reading and configuring the List.

In accordance with one aspect of the invention, a computer system containing a plurality of UI language settings is provided. The plurality of UI language settings may include an application UI language preference list ("APL"), a user UI language preference list ("UPL"), and an ultimate fallback UI language ("original UI language"), etc.

One aspect of the invention merges the plurality of UI language settings into the List. For example, the invention merges the APL to the List, merges the UPL to the List, and adds the original UI language to the List.

When merging the APL to the List, the invention adds a language in the APL to the List only if the language is not already in the List. The invention also adds a neutral language of the added language to the List if the added language is a language specific.

When merging the UPL to the List, the invention adds a language in the UPL to the List only if the language is not already in the List. The invention merges a parent language of the added language to the List if the language is a LIP language, and a base language of the added language to the List if the language is a partially localized language.

When merging a parent language of the added language to the List, the invention adds a valid parent language of the added language to the List, after the added language, only if no parent language of the added language is already in the List. The invention also merges a base language of the valid parent language to the List if the valid parent language is a partially localized language. The invention removes the added language from the List if no valid parent language can be found for the added language. A valid parent language is a language that is supported by the OS and is an installed language of the computer system.

When merging a base language of the added language to the List, the invention adds a valid base language of the added language to the List, after the added language, if no base language of the added language is in the List. The invention adds a base language of the valid base language if the valid base language is a partially localized language. The invention removes the added language from the List if no valid base language is found for the added language. A valid base language is a language that is supported by the system.

Another aspect of the invention provides an application programming interface. The application programming interface includes services related to configuring UI language settings integrated in the List. For example, the application programming interface may provide a group of functions related to setting and retrieving user UI language preferences in the List. The application program interface may also include a group of functions related to setting and retrieving application UI language preferences in the List.

In summary, the invention provides a system and method that collects and merges various UI language settings and related dependency data into an integrated UI language preference list. The invention thus introduces a centralized approach to satisfy different UI language usage scenarios. The invention also provides a set of API functions that enables each resource loader to gain consistent UI language support while avoiding maintaining complex resource probing logic internally.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the invention provide a system and method that merge different UI language related settings and dependency data into one integrated UI language preference list. The integrated UI language preference list ("the List") provides a systematic approach to manage system-wide resource loading logic. The invention also provides a set of API functions that allow resource loaders and applications to query or modify system resource look-up behaviors through the List.

The following text first describes exemplary UI language preference settings defined by exemplary categories of factors illustrated in FIG. 1 and detailed in the Background of Invention section of this document. Then a computer-implemented method is described. The computer-implemented method merges the exemplary UI language preference settings into the List so to provide a centralized and systematic approach for managing resource loading in a MUI system. Finally, an exemplary API is described that enables resource loaders in a MUI system to query and modify the List so to define resource look-up behaviors. The illustrative examples provided herein are not intended to be exhaustive or to limit the invention to the precise forms disclosed. Similarly, any steps described herein may be interchangeable with other steps, or combinations of steps, in order to achieve the same result.

I. Exemplary UI Language Settings

Figure 2:
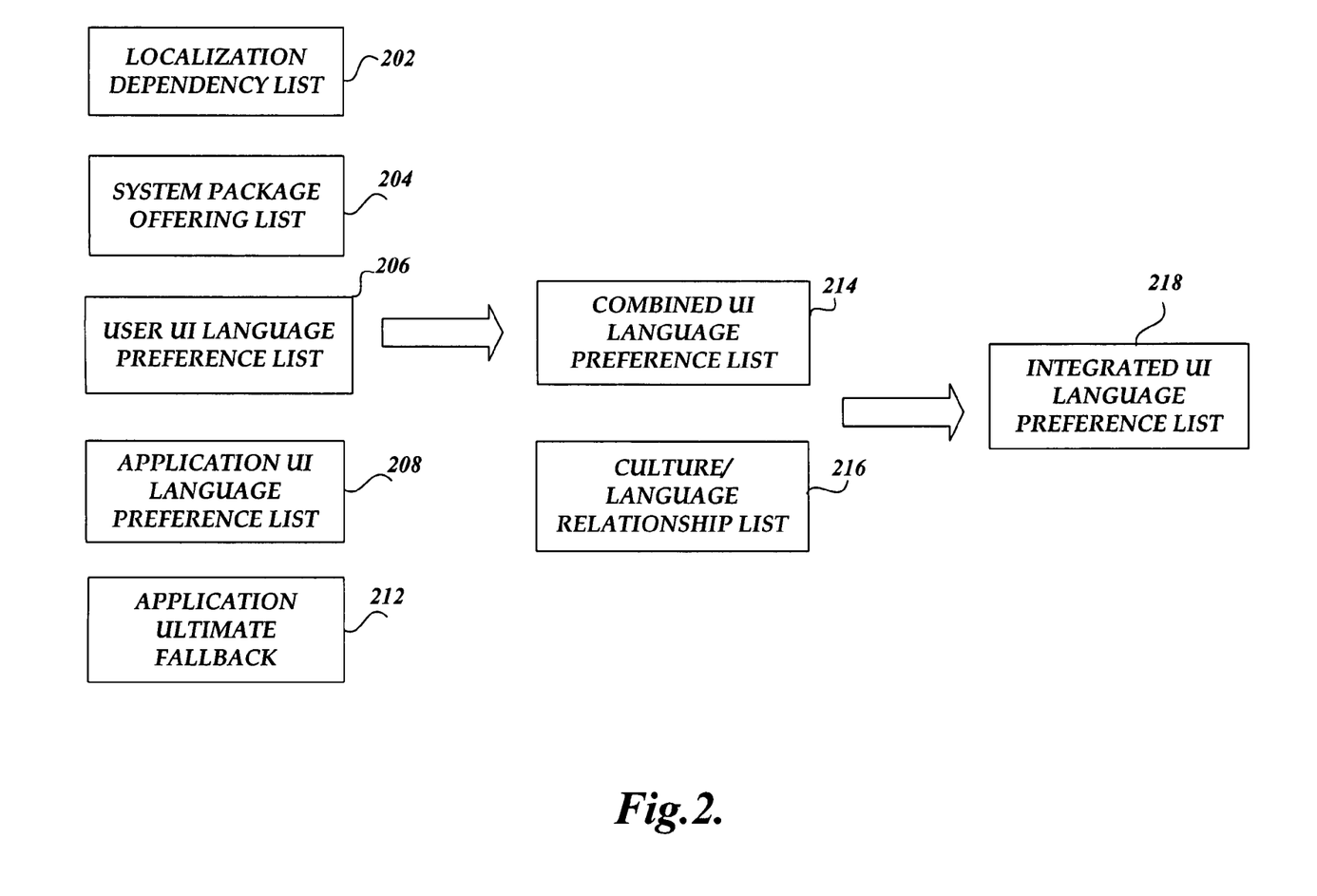
FIG. 2 is a block diagram illustrating one aspect of the invention wherein UI language preference lists resulted from different UI language settings are merged into one integrated UI language preference list.

Each of the exemplary categories of factors illustrated in FIG. 1 results in a UI language setting or preference list. A UI language preference list is also called resource search priority, which controls the order in which a resource loader uses to decide which language resource to load when a specified language resource is not available. FIG. 2 illustrates UI language preference lists dictated by the exemplary categories of factors illustrated in FIG. 1.

For example, the localization dependency list 202 includes UI languages dictated by the first category of factors—System UI Localization Coverage and Dependency 102. Conventionally, if localization work is scheduled for a language, all resources for the language are localized. However, because of the high cost of translation and testing, localizing all resources in an OS to a particular language sometimes is not justified for the return of investment. Additionally, most users do not use all features provided by an OS or application. Therefore, depending on market needs and user behaviors, a scalable localization scheme may be adopted for a MUI system—this means that certain resources will not be localized in certain languages if there is no business justification or real user needs. Therefore, in a MUI system, a language may be localized at one of two levels: full localization and partial localization. For a language that receives the full localization treatment, all the UI resources for the whole system are translated to the language; no other language is necessary for resource fallback; an end user will be able to get any UI item in the system in the language. On the other hand, for a language receiving the partial localization treatment, only some of the UI resources are translated into the language. A language receiving the partial localization treatment can be partially localized as an add-on ("LIP language") or with no resource duplication ("partially localized language").

For a partially localized language, part of the UI resources are localized to the language while the resources not covered by the language will be covered by another language called the base language. If the base language itself is partially localized, another base language can be used to cover the rest of the resources. For example, a software vendor may want to release an OS partially localized in Romansch—one of the languages spoken in Switzerland. Because the program is only partially localized in Romansch, languages such as German, Italian, and French—the other official languages spoken in Switzerland—can be added as the base languages for Romansch. As a result, in the OS with the Romansch as a partially localized language, the resources not localized in Romansch can be viewed in one of the three base languages.

As those of ordinary skill in the art will appreciate, a LIP is also called the language interface pack, which are add-ons installed on top of a running system. A LIP does not contain the full set of resources of the running system. The LIP needs to be installed on top of another language known as the parent language of the LIP language. A setup program for a LIP verifies that a parent language of the LIP language is installed on the running system before installing the LIP. If the LIP language has multiple designated parent languages, then at least one parent language needs to be installed on the running system. The author of a LIP decides which language is a parent language and how many parent languages a particular LIP language has. The resources that a LIP does not include will be displayed in one of the parent languages. In exemplary embodiments of the invention, a LIP language can have three different kinds of parent languages: a single parent language, multiple parent languages, and default. Default means that no parent languages are defined for the LIP language, thus any language on the running system can be used as a parent language for the LIP language.

The second category—System Package Offering 104 dictates a system package offering list 204, which identifies at least the installation language of a system. An install language is specified for backwards compatibility needs and is defined as the first UI language installed on a system. The system package offering list 204 may also identify any other languages installed in the system, as well as any dependent languages of the installed languages, if the installed languages are only partially localized.

The third category—User UI Language Preference 66 dictates a user UI language preference list 206 ("UPL"). Different users can speak different languages and would prefer different language fallback orders if a translation for the user's primary speaking language is not available. In an exemplary embodiment of the invention, a user is able to specify a UPL that addresses the user's preference in UI language fallback orders. The first language in the UPL will be used to load for all UI resources. Other languages in the list will be used to search for resources if the first search using the first UI language in the list fails. In addition, if an application has not set the application UI languages specifically, the UPL will be used to look for application UI language resources. In an exemplary embodiment of the invention, the UPL contains only one language, which is the first installed UI language in the system. In another exemplary embodiment of the invention, if none of the UI languages specified in the UPL is an installed language, the UPL is treated as an empty list and a machine UI language in a machine UI language list is used. A machine UI language list determines a machine's UI language preference list. During the installation of the machine, a setup program will add the first installed UI language to the machine UI language preference list. After setting up the machine, an administrator can also change the machine UI language preference list.

The fourth category—Application Localization Coverage or User Setting 108 dictates an application UI language preference list 208 ("APL"). An APL may be implemented as a per-thread setting so different applications may have different UI language coverage on the same system. In an exemplary embodiment of the invention, an application creates and owns its APL. When creating an APL, the application also includes a UI language's base language or parent language, if the UI language is a partially localized language or a LIP language. If an APL includes more UI languages than what is available in the system, or if the application wants to support a different set of UI languages other than the ones stored on the system, a user may specify the preferred UI languages for the application. In an exemplary embodiment of the invention, a user may specify a set of UI languages that is applicable to an individual application or to all applications in the MUI system.

The sixth category—Design Time Knowledge 112-dictates an application ultimate fallback 212, which specifies what language resources a resource loader can count on when all the other language searches fail. The application ultimate fallback 212 is designated for any resource files of the system.

FIG. 2 further illustrates one aspect of the invention wherein the UI language preference lists resulted from the exemplary categories of factors are combined and merged into one integrated UI language preference list, i.e., the List. As shown in FIG. 2, the localization dependency list 202, the system package offering list 204, the UPL 206, the APL 208, and the application ultimate fallback 212 are first combined into a combined language preference list 214. The combined language preference list 214 is then extended with UI languages resulting from the fifth exemplary category—Cultural and Language Relationship 110. More specifically, languages specific in the combined language preference list 214 are supplemented by their corresponding root languages. The resulting list is the integrated UI language preference list 218, i.e., the List.

II. Process for Creating an Integrated UI Language Preference List

FIGS. 3-7 are flow diagrams illustrating computerized process and routines according to an exemplary embodiment of the invention. The computerized process and routines are described in reference to FIGS. 1-2. The computerized process and routines are desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution, installation, and execution on a (suitably equipped) computer.

Figure 3:
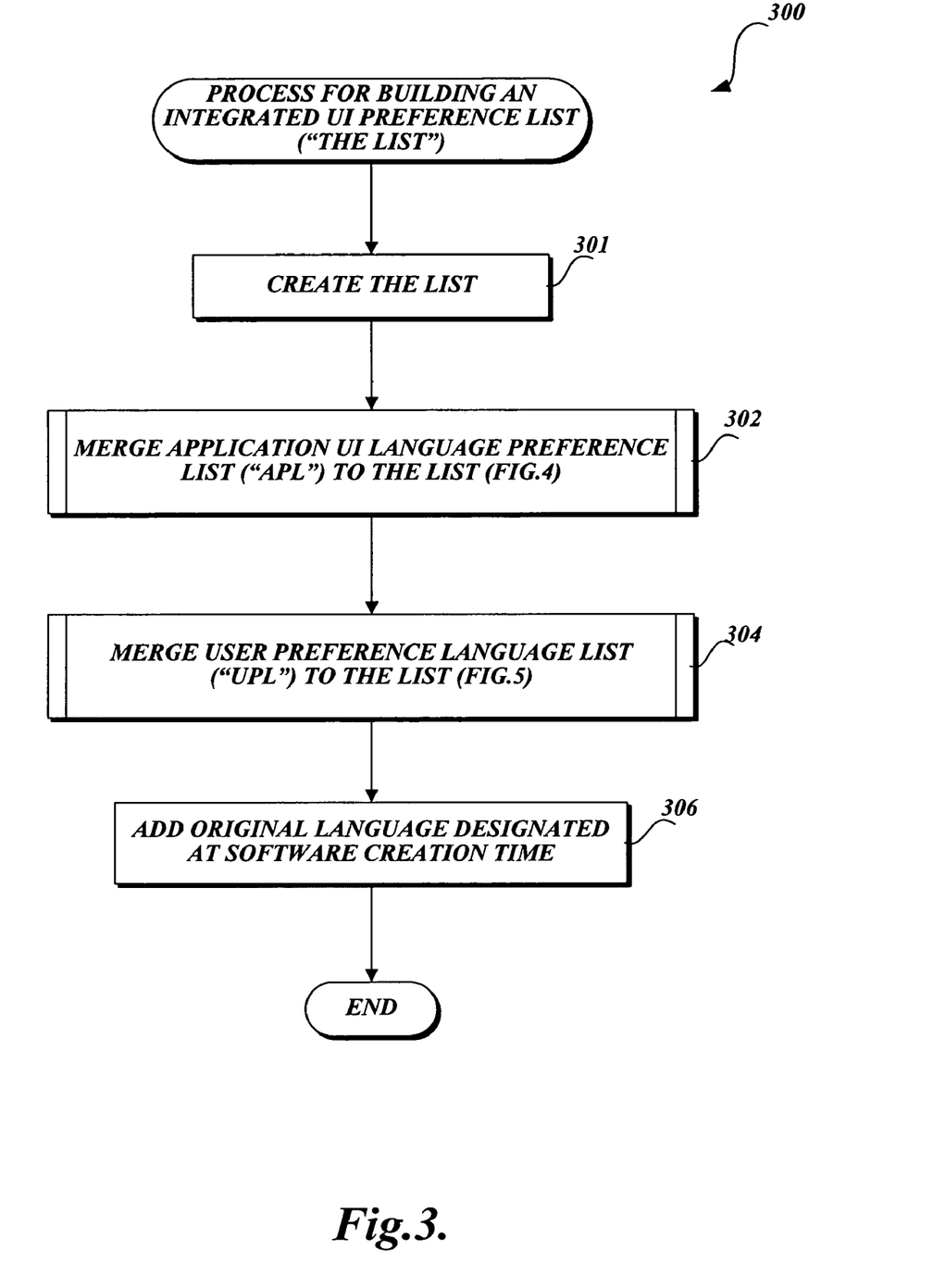
FIG. 3 is a flow diagram illustrating an exemplary process for building an integrated UI preference list.
Figure 4:
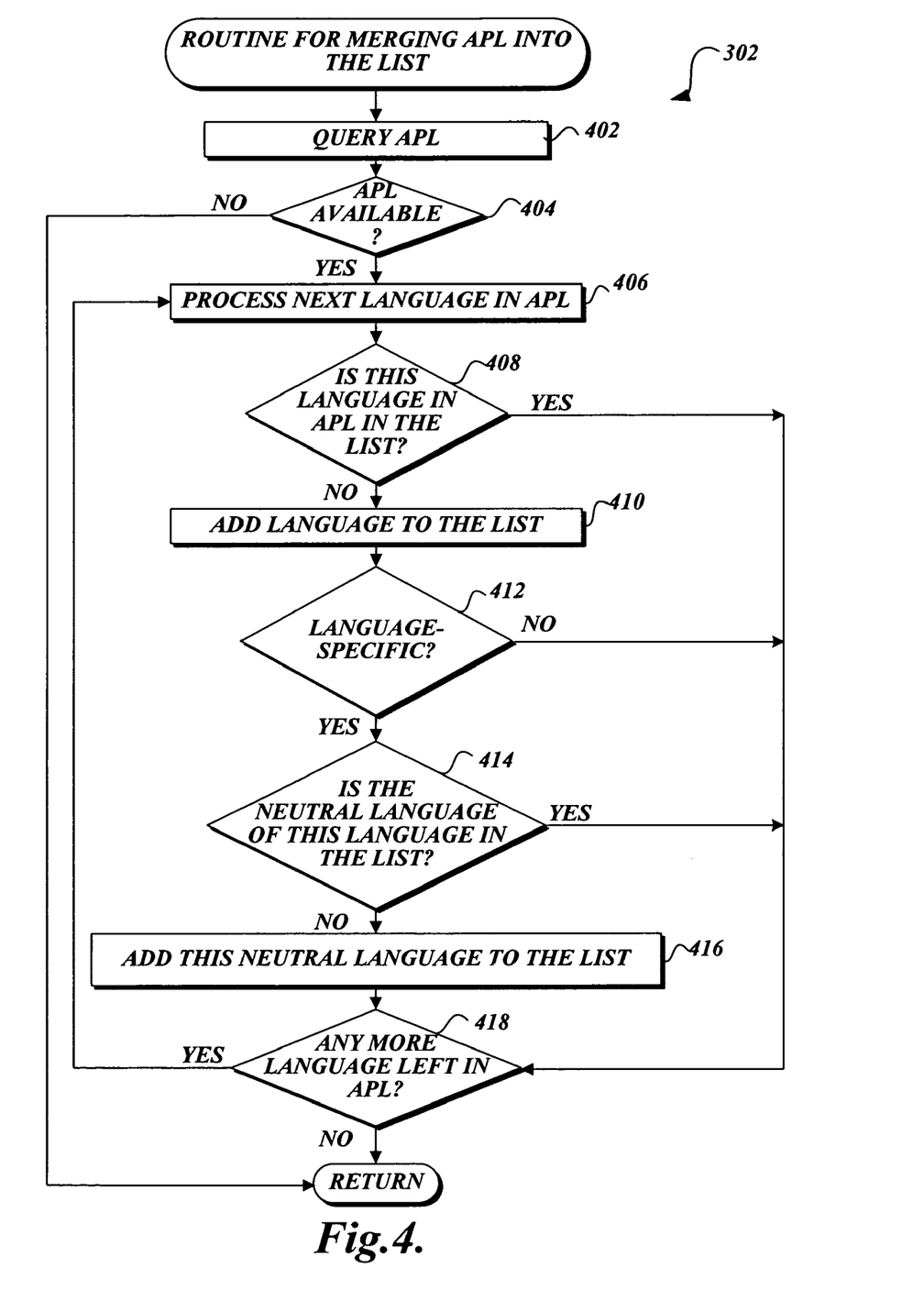
FIG. 4 is a flow diagram illustrating an exemplary routine for merging an application UI language preference list into the integrated UI language preference list, suitable for use in FIG. 3.
Figure 5:
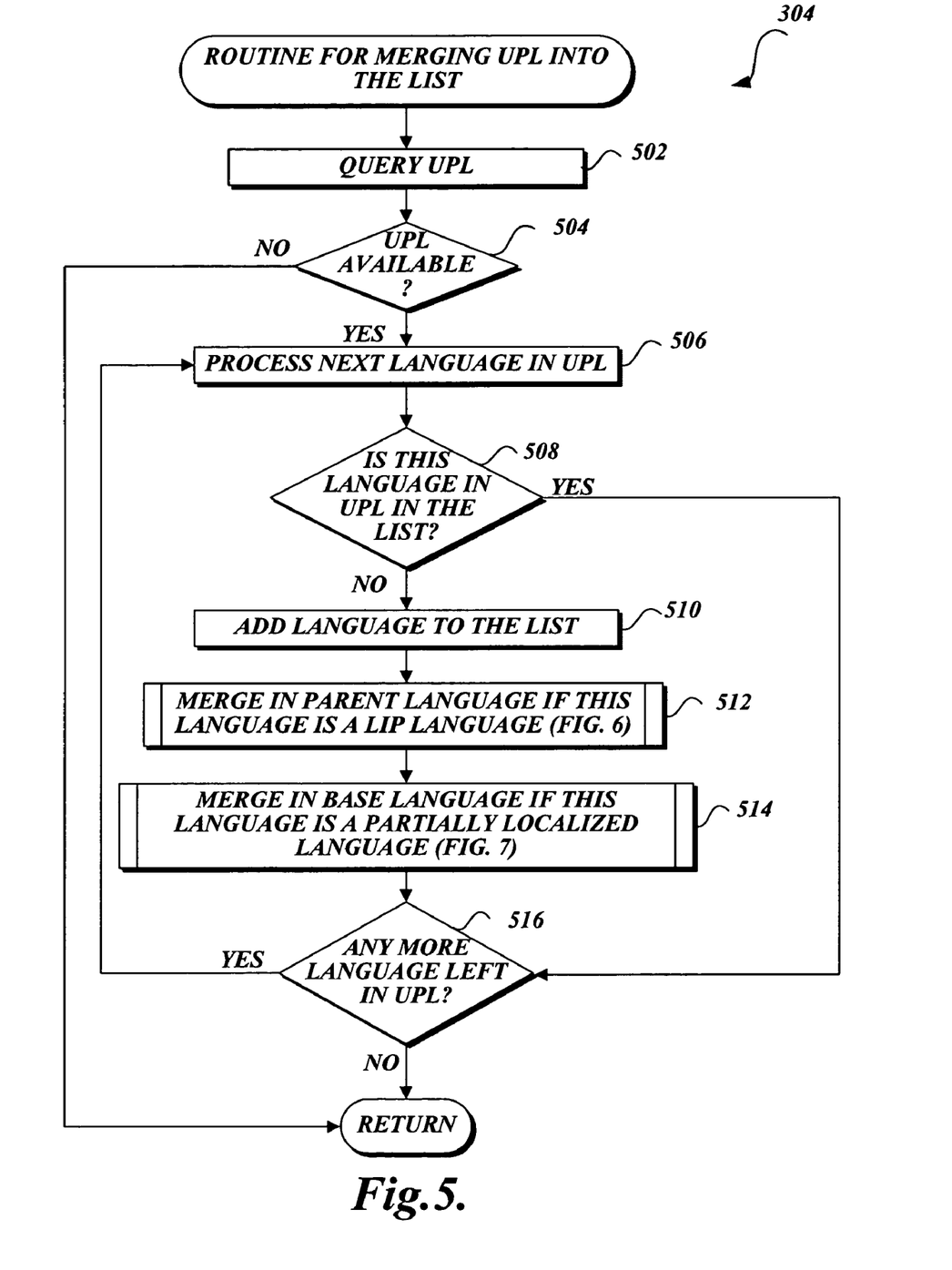
FIG. 5 is a flow diagram illustrating an exemplary routine for merging a user UI language preference list into the integrated UI language preference list, suitable for use in FIG. 3.

Specifically, FIG. 3 is a flow diagram illustrating an exemplary process 300 for building an integrated UI language preference list, such as the integrated UI preference list 218 illustrated in FIG. 2 ("the List"). The process 300 first creates the List. See block 301. The process 300 then executes a routine 302 that merges an APL into the List. See block 302. FIG. 4 is a flow diagram illustrating an exemplary routine 302 and will be discussed in detail later. After executing the routine 302, the process 300 executes a routine 304 that merges a UPL into the List. See block 304. FIG. 5 is a flow diagram illustrating an exemplary routine 304 and will be discussed in detail later. After executing the routine 304, the process 300 adds to the List the application ultimate fallback 212, i.e., the original UI language for the application designated at the time when the application is developed. See block 306. The process 300 then terminates and the List has been built that integrates different UI language preference lists in a MUI system.

As noted above, FIG. 4 is a flow diagram illustrating an exemplary routine 302 that merges an APL into the List. The routine 302 first queries the APL. See block 402. The routine 302 then uses the query result to determine whether an APL exists. See decision block 404. If the answer is NO, the routine 302 returns. If an APL is available, the routine 302 proceeds to process each language in the APL, starting with the first language in the APL. See block 406. The routine 302 first determines whether the language in the APL is already in the List. See decision block 408. If the answer to decision block 408 is YES, meaning that the language in the APL is already in the List, the routine 302 proceeds to decision block 418 to determine whether there is another language in the APL. See decision block 418. If the answer to decision block 418 is YES, the routine 302 loops back to block 406 to process the next language in the APL. If the answer to decision block 418 is NO, meaning there is no more language in the APL, the routine 302 returns.

If the answer to decision block 408 is NO, meaning that the language in the APL is not in the List, the routine 302 proceeds to add the language to the List. See block 410. The routine 302 then determines whether the added language is a language specific. See decision block 412. If the answer to decision block 412 is NO, meaning that the language is not a language specific, the routine 302 proceeds to decision block 418 to determine whether there is another language in the APL to be processed. If the answer to decision block 412 is YES, meaning that the language is language specific, the routine 302 proceeds to determine whether the neutral language, i.e., the root language of the language is already in the List. See decision block 414. If the answer to decision block 414 is YES, the routine 302 proceeds to decision block 418 to determine whether there is another language in the API to be processed. If the answer to decision block 414 is NO, meaning that the neutral language of the language is not in the List, the routine 302 proceeds to add the neutral language of the language to the List. See block 416. The routine 302 then proceeds to decision block 418 to determine whether there is another language in the APL to be processed. If the answer to decision block 418 is NO, the routine 302 returns.

As noted above, FIG. 5 is a flow diagram illustrating an exemplary routine 304 that merges a UPL into the List. The routine 304 first queries the UPL. See block 502. The routine 304 then uses the query result to determine whether a UPL is available. See decision block 504. If the answer is NO, the routine 304 returns. If a UPL is available, the routine 304 proceeds to process each language in the UPL, starting with processing the first language in the UPL. See block 506. The routine 304 first determines whether the language in the UPL is already in the List. See decision block 508. If the UI language is already in the List, the routine 304 proceeds to decision block 516 to determine whether there is another language in the UPL to be processed. See decision block 516. If the answer to decision block 516 is YES, the routine 403 loops back to block 506 to process another language in the UPL. If there is no more language in the UPL to be processed, the routine 304 returns.

Figure 6:
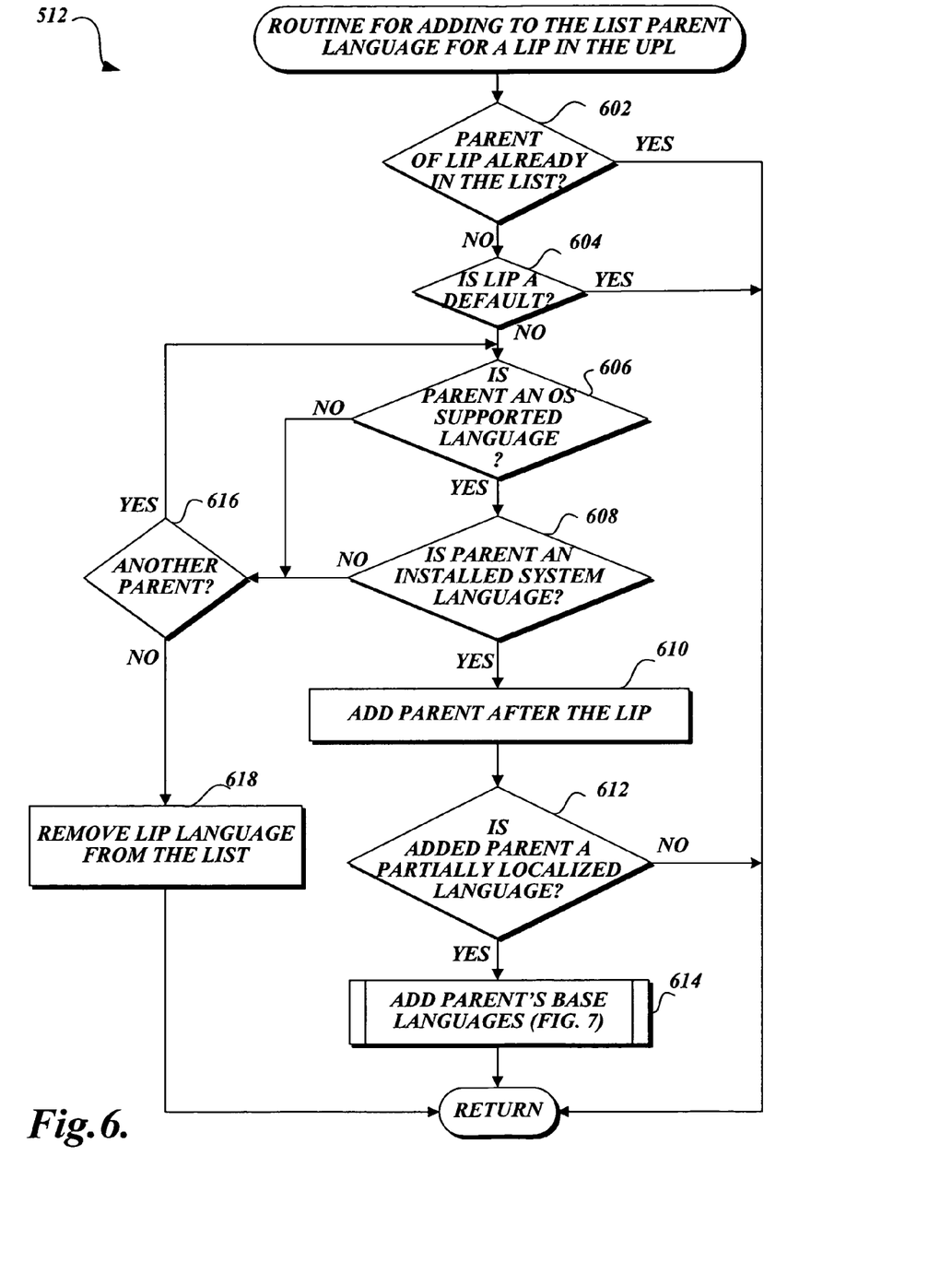
FIG. 6 a flow diagram illustrating an exemplary routine for merging a parent language of a LIP language into the integrated UI language preference list, suitable for use in FIG. 5.
Figure 7:
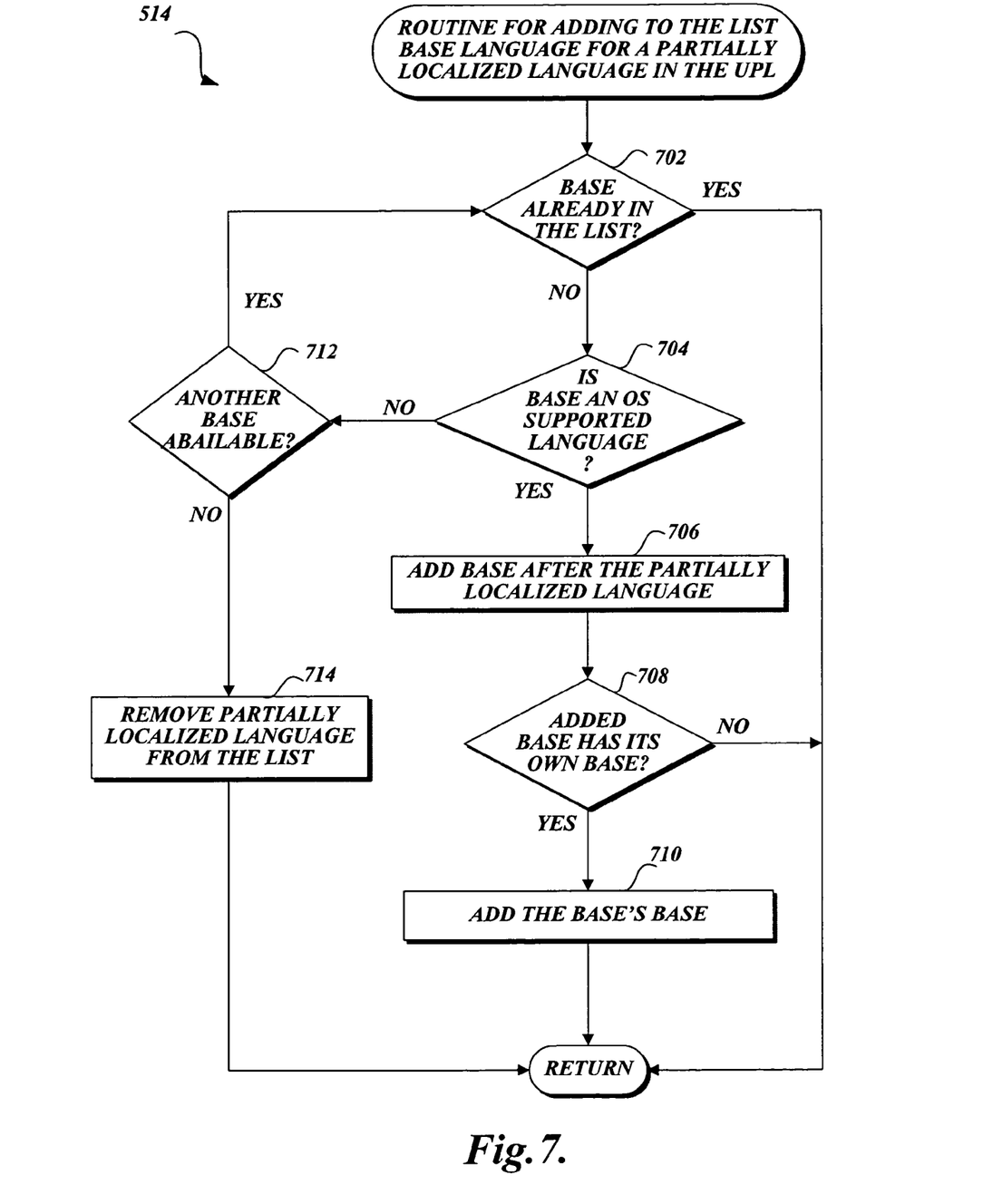
FIG. 7 is a flow diagram illustrating an exemplary routine for merging a base language of a partially localized language into the integrated UI language preference list, suitable for use in FIGS. 5 and 6.

If the answer to decision block 508 is NO, meaning that the language is not in the List, the routine 304 adds the language to the List. See block 510. In the case that the added language is a LIP language, the routine 304 executes a routine 512 to merge a valid parent language of the added language into the List. See block 512. FIG. 6 is a flow diagram illustrating an exemplary routine 512 and will be described in detail later. If the added language is a partially localized language, the routine 304 executes a routine 514 to merge a valid base language of the added language into the List. FIG. 7 is a flow diagram illustrating an exemplary routine 514 and will be described in detail later. The routine 304 then proceeds to the decision block 516 to determine if there is another language in the UPL to be processed. If no more language in the UPL needs to be processed, the routine 304 returns.

As noted above, FIG. 6 is a flow diagram illustrating an exemplary routine 512 for adding to the List a valid parent language for a LIP language in the UPL. In embodiments of the invention, the List should contain one parent language for a LIP language. A user may specify a parent language for a LIP language. In the case that a user does not specify a parent language, a default parent language will be considered.

Specifically, the routine 512 first determines whether a parent language of the LIP language has already existed in the List. See decision block 602. If the answer is YES, the routine 512 does not need to add any other parent language of the LIP to the List. The routine 512 returns.

If the answer to decision block 602 is NO, meaning that the List contains no parent language of the LIP language, the routine 512 proceeds to determine whether the LIP language is of default type, i.e., accepting any UI language in the system to be a parent language. See decision block 604. If the answer to decision block 604 is YES, the routine 512 returns. If the answer to decision block 604 is NO, meaning that the routine 512 has yet to enter a valid parent language for the LIP language. The routine 512 proceeds to determine if the user-selected or default parent language is a supported language and installed in the system. The routine 512 first determines whether the parent language is a language supported by the OS. See decision block 606. If the answer to the decision block 606 is YES, the routine 512 further determines whether the parent language is an installed system language. See decision block 608. If the answer to decision block 608 is YES, meaning that the parent language is one of the installed system languages, the routine 512 proceeds to add the parent language after the LIP language in the List. See block 610.

The routine 512 then proceeds to determine if the added parent language itself is a partially localized language. See decision block 612. If the answer is NO, the routine 512 has found a valid parent language for the LIP language and the routine 512 returns. If the answer to decision block 612 is YES, the routine 512 executes the routine 514 that finds and adds into the List the valid base languages of the added parent language. See block 514. As noted above, FIG. 7 is a flow diagram illustrating an exemplary routine 514 and will be discussed in detail later. After executing the routine 514, the routine 512 returns.

If the answer to decision block 606 or decision block 608 is NO, meaning that the parent language of the LIP language is not a language supported by the OS, nor an installed system language, the routine 512 proceeds to determine if there is another parent language designated for the LIP language. See decision block 616. If the answer to decision block 616 is YES, the routine 512 loops back to decision block 606 to start processing this parent language. If the answer to decision block 616 is NO, meaning that there is no more designated parent language for the LIP language, the routine 512 proceeds to remove the LIP language from the List. See block 618. The routine 512 then returns.

FIG. 7 is a flow diagram illustrating an exemplary routine 514 that adds to the List a valid base language for a partially localized language in the UPL. In an exemplary embodiment of the invention, a user may specify a base language for a partially localized language. In the case that a user does not specify a base language for a partially localized language, a default base language may be considered.

Specifically, routine 514 starts by determining whether a valid base language for the partially localized language is already in the List. See decision block 702. If the answer to decision block 702 is YES, the routine 514 has no need to find another base language for the partially localized language; the routine 514 returns. If the answer to decision block 702 is NO, the routine 514 proceeds to determine if the user-selected or the default base language is a valid base language for the partially localized language by determining whether the base language is a language supported by the OS. See decision block 704. If the answer to decision block 704 is YES, the routine 514 adds the base language after the partially localized language in the List. See block 706.

The routine 514 then proceeds to determine whether the added base language has its own base, i.e., the added base language itself is a partially localized language. See decision block 708. If the answer to decision block 708 is NO, meaning the added base language is fully localized, the routine 514 returns. If the answer to decision block 708 is YES, meaning that the added base language is partially localized and thus has its own base language, the routine 514 proceeds to add into the List the base language of the added base language. See block 710. The routine 514 then returns.

When the answer to decision block 704 is NO, meaning that the base language is not a language supported by the OS, the routine 514 proceeds to determine whether there is another base language available for the partially localized language. See decision block 712. If the answer to decision block 712 is YES, the routine 514 loops back to decision block 704 to process the selected base language. If the answer to decision block 712 is NO, meaning there is no more designated base language for the partially localized language, the routine 514 proceeds to remove the partially localized language from the List. See block 714. The routine 514 returns.

III. API for Using the Integrated UI Language Preference List

Figure 8:
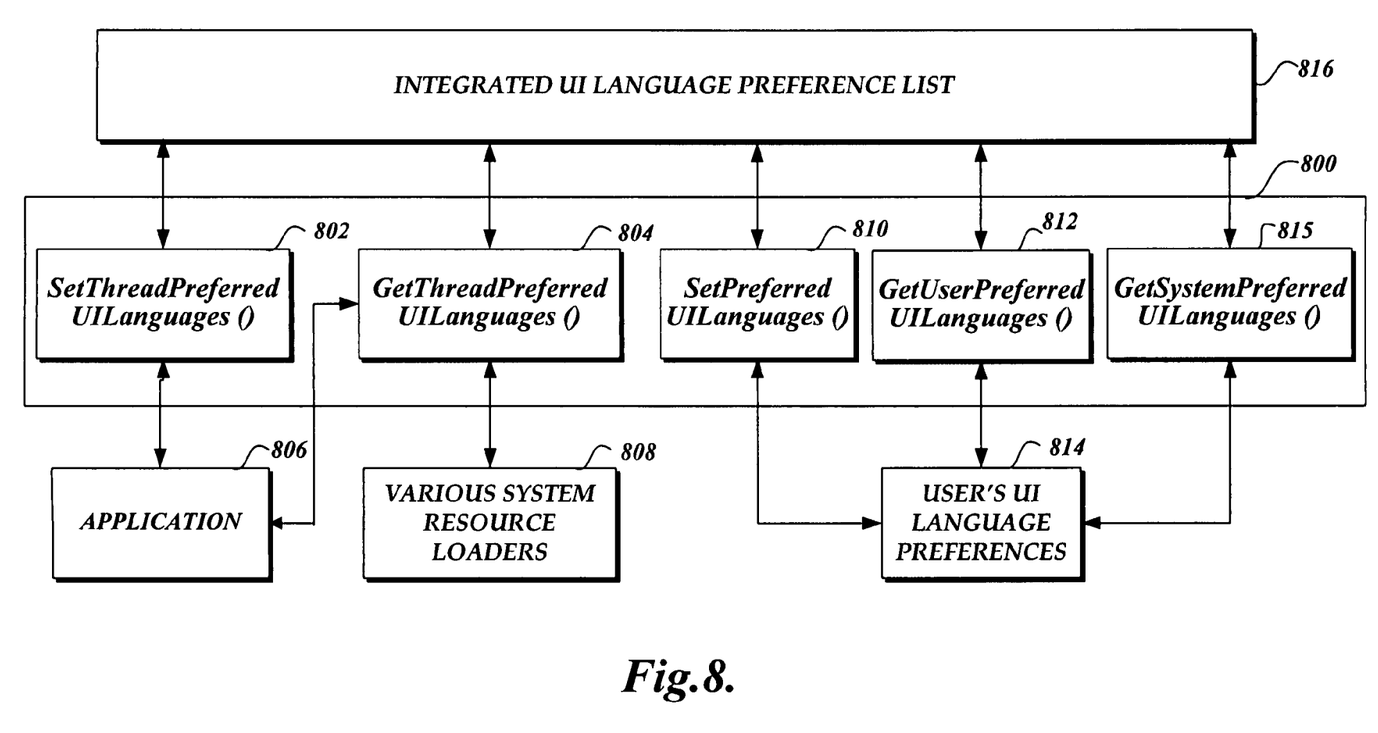
FIG. 8 is a block diagram illustrating exemplary API functions provided by the invention.

Exemplary embodiments of the invention further provide a set of API functions to allow different resource loaders and/or applications to use, e.g., query and/or modify, the integrated UI language preference list, i.e., the List. FIG. 8 is a block diagram illustrating an exemplary API 800 and how the API 800 may be used by different entities in a MUI system.

As shown in FIG. 8, the API 800 includes a SetThreadPreferredUILanguages( ) function 802 and a GetThreadPreferredUILanguages( ) function 804. The SetThreadPreferredUILanguage( ) function 802 allows an application to set a list of preferred UI languages for the thread that runs the application. The function validates the input languages to ensure that each input language is supported by the OS. The function may also provide convenient flag values to indicate whether each input language can be displayed in a console window with the current system settings. The function may also be configured to accept a limited number of input languages. The GetThreadPreferredUILanguages( ) function 804 returns an application's preferred UI languages that are set by the SetThreadPreferredUILanguages( ) function 802. As shown in FIG. 8, an application 806 can use the SetThreadPreferredUILanguages( ) function 802 and the GetThreadPreferredUILanguages( ) to modify and retrieve application preferred UI languages in an integrated UI language preference list 816. Various system UI resource loaders 808 can use the GetThreadPreferredUILanguages( ) function

804 to retrieve an application's preferred UI languages from the integrated UI language preference list 816.

The exemplary API 800 may also include a SetPreferredUILanguages( ) function 810, a GetUserPreferredUILanguages( ) function 812 and a GetSystemPreferredUILanguage( ) function 815. The SetPreferredUILanguages( ) function 810 configures a user's UI language preferences. This function may also be configured to set a machine's UI language preferences. In an exemplary embodiment of the invention, this function is a private function, thus can be only used internally and no external components can programmatically set user or machine UI language preferences. If the input languages for this function are for user UI language preferences, this function ensures that the input languages are supported by the OS and are installed system languages, and that the input language list only contains the number of languages that are allowed by the system. If the input language list is for machine UI language preferences, the function ensures that all languages are supported by the OS, that the first language in the list is installed on the system, and that other languages in the list are the bases or parents of the first language in the list. This function also ensures the input language list does not contain any duplicate language entries. The GetUserPreferredUILanguages( ) function 812 and the GetSystemPreferredUILanguage( ) function 815 return user or machine preferred UI languages that are set by the SetPreferredUILanguages( ) function 810. As shown in FIG. 8, the SetPreferredUILanguages( ) function 810, the GetUserPreferredUILanguages( ) function 812, and the GetSystemPreferredUILanguage( ) function 815 can be used by a caller to update and retrieve user UI language preferences 814 from the integrated UI language preference list 816.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of operating a computer to present a user interface, the method comprising creating an integrated User Interface (UI) language preference list ("the List") in a computer system having multiple UI language settings including an application UI language preference list ("APL"), a user UI language preference list ("UPL"), and an ultimate fallback UI language ("original UI language"), the method comprising merging one or more of the multiple UI language settings to the List, the merging one or more of the multiple UI language settings to the List including merging the UPL to the List, the merging the UPL, comprising:
   with a processor of the computer:
   (a) adding a language in the UPL, to the List if the language is not already in the List;
   (b) merging a parent language of the added language to the List if the added language is a Language Interface Pack (LIP) language, wherein the LIP language is a software application added on to a language installed on the computer system upon verifying that the language installed on the computer system is a valid parent language of the LIP language; and
   (c) merging a base language of the added language to the List if the added language is a partially localized language, wherein the base language is a language in which a majority of user interface resources is displayed to a user, and the partially localized language is a language in which a remainder of the user interface resources is displayed to the user; and the method further comprising:
   selecting from among one or more language resources available on the computer in an order established by the List; and
   rendering a display using the selected language resource.

2. The computer method of claim 1, wherein merging one or more of the multiple UI language settings to the List includes:
   merging the APL to the List; and
   adding the original UI language to the List.

3. The computer method of claim 2, wherein merging the APL to the List includes:
   (a) adding a language in the APL to the List if the language is not already in the List;
   (b) adding a neutral language of the added language to the List if the added language is a language specific, the neutral language being a root language of the language specific, wherein if the neutral language is English, the language specific is at least one of American English and British English; and
   (c) repeating (a)-(b) for each language in the APL.

4. The computer method of claim 1 wherein merging a parent language of the added language to the List if the added language is a LIP language includes:
   (a) adding the valid parent language of the added language to the List, after the added language, if no parent language of the added language is already in the List;
   (b) merging the base language of the valid parent language to the List if the valid parent language is a partially localized language; and
   (c) removing the added language from the List if no valid parent language is found for the added language.

5. The computer method of claim 4, wherein the valid parent language of the added language is a language supported by the computer system and is an installed language of the computer system.

6. The computer method of claim 1, wherein merging a base language of the added language to the List if the added language is a partially localized language includes:
   (a) adding a valid base language of the added language to the List, after the added language, if no base language of the added language is in the List; and
   (b) adding a base language of the valid base language if the valid base language is a partially localized language; and
   (c) removing the added language from the List if no valid base language is found for the added language.

7. The computer method of claim 6, wherein the valid base language of the added language is a language supported by the computer system.

8. The computer method of claim 1, further comprising providing an application programming interface, the application programming interface including separate commands to request services related to setting and retrieving UI language settings through the List.

9. The computer method of claim 8, wherein the application programming interface includes a first group of functions related to setting and retrieving user UI language preferences, the first group of functions including:
   validating input languages to ensure that each input language is supported by the computer system; and
   providing a flag value for each input language indicating whether the language will be displayed to the user.

10. The computer-implemented method of claim 8, wherein the application programming interface includes a second group of functions related to setting and retrieving application UI language preferences, the second group of functions including configuring the user's user interface language preferences.

11. A computer system for creating an integrated user interface (UI) language preference list ("the List"), comprising:
(a) a memory; and
(b) a data processor, coupled with the memory, for merging a plurality of UI language settings to an integrated UI language preference list ("the List"), wherein the plurality of UI language settings include an application UI language preference list ("APL"), a user UI language preference list ("UPL"), and an ultimate fallback UI language ("original UI language"), the merging a plurality of UI language settings to the List including merging the UPL to the List, the merging the UPL comprising:
(i) adding a language in the UPL to the List if the language is not already in the List;
(ii) merging a parent language of the added language to the List if the added language is a Language Interface Pack (LIP) language, wherein the LIP language is a software application added on to a language installed on the computer system upon verifying that the language installed on the computer system is a valid parent language of the LIP language; and
(iii) merging a base language of the added language to the List if the added language is a partially localized language, wherein the base language is language in which a majority of user interface resources is displayed to a user, and the partially localized language is a language in which a remainder of the user interface resources is displayed to the user
(c) wherein the data processor is further adapted for selecting from among one or more language resources available on the computer in an order established in the List.

12. The computer system of claim 11, wherein the data processor merges the plurality of UI language settings to the List by:
merging the APL to the List;
adding the original UI language to the List.

13. The computer system of claim 12, wherein merging the APL to the List includes:
(a) adding a language in the APL to the List if the language is not already in the List;
(b) adding a neutral language of the added language to the List if the added language is a language specific, the neutral language being a root language of the language specific, wherein if the neutral language is English, the language specific is at least one of American English and British English; and
(c) repeating (a)-(b) for each language in the APL.

14. The computer system of claim 11, wherein merging a parent language of the added language to the List if the added language is a LIP language includes:
(a) adding the valid parent language of the added language to the List, after the added language, if no parent language of the added language is already in the List;
(b) merging the base language of the valid parent language to the List if the valid parent language is a partially localized language; and
(c) removing the added language from the List if no valid parent language is found for the added language.

15. The computer system of claim 14, wherein a valid parent language of the added language is language supported by the computer system and is an installed language of the computer system.

16. The computer system of claim 11, wherein merging a base language of the added language to the List if the added language is a partially localized language includes:
(a) adding the valid base language of the added language to the List, after the added language, if no base language of the added language is in the List; and
(b) adding the base language of the valid base language if the valid base language is a partially localized language; and
(c) removing the added language from the List if no valid base language is found for the added language.

17. The computer system of claim 16, wherein a valid base language of the added language is a language supported by the computer system.

18. The computer system of claim 11, further comprising an application programming interface, the application programming interface including separate commands to request services related to setting and retrieving UI language settings through the List.

19. The computer system of claim 18, wherein the application programming interface includes a first group of functions related to setting and retrieving user UI language preferences, the first group of functions including:
validating input languages to ensure that each input language is supported by the computer system; and
providing a flag value for each input language indicating whether the language will be displayed to the user.

20. The computer system of claim 18, wherein the application programming interface includes a second group of functions related to setting and retrieving application UI language preferences, the second group of functions including configuring the user's user interface language preferences.

* * * * *

UNITED STATES PATENT AND TRADEMARK OFFICE
CERTIFICATE OF CORRECTION

| | | |
|---|---|---|
| PATENT NO. | : 7,669,124 B2 | |
| APPLICATION NO. | : 11/112991 | |
| DATED | : February 23, 2010 | |
| INVENTOR(S) | : Shenghua Ye et al. | |

It is certified that error appears in the above-identified patent and that said Letters Patent is hereby corrected as shown below:

In column 13, line 1, in Claim 10, delete "computer-implemented" and insert -- computer --, therefor.

In column 13, line 10, in Claim 11, after "memory;" delete "and".

In column 13, line 37, in Claim 11, after "user" insert -- ; and --.

Signed and Sealed this
Eighth Day of February, 2011

David J. Kappos
*Director of the United States Patent and Trademark Office*